3,104,157
UNIVERSAL CAUSTIC REGENERATION
PROCESS
Charles Newton Kimberlin, Jr., and William Floyd Arey, Jr., Baton Rouge, La., assignors to Esso Research and Engineering Company, a corporation of Delaware
Filed Mar. 21, 1961, Ser. No. 97,234
5 Claims. (Cl. 23—184)

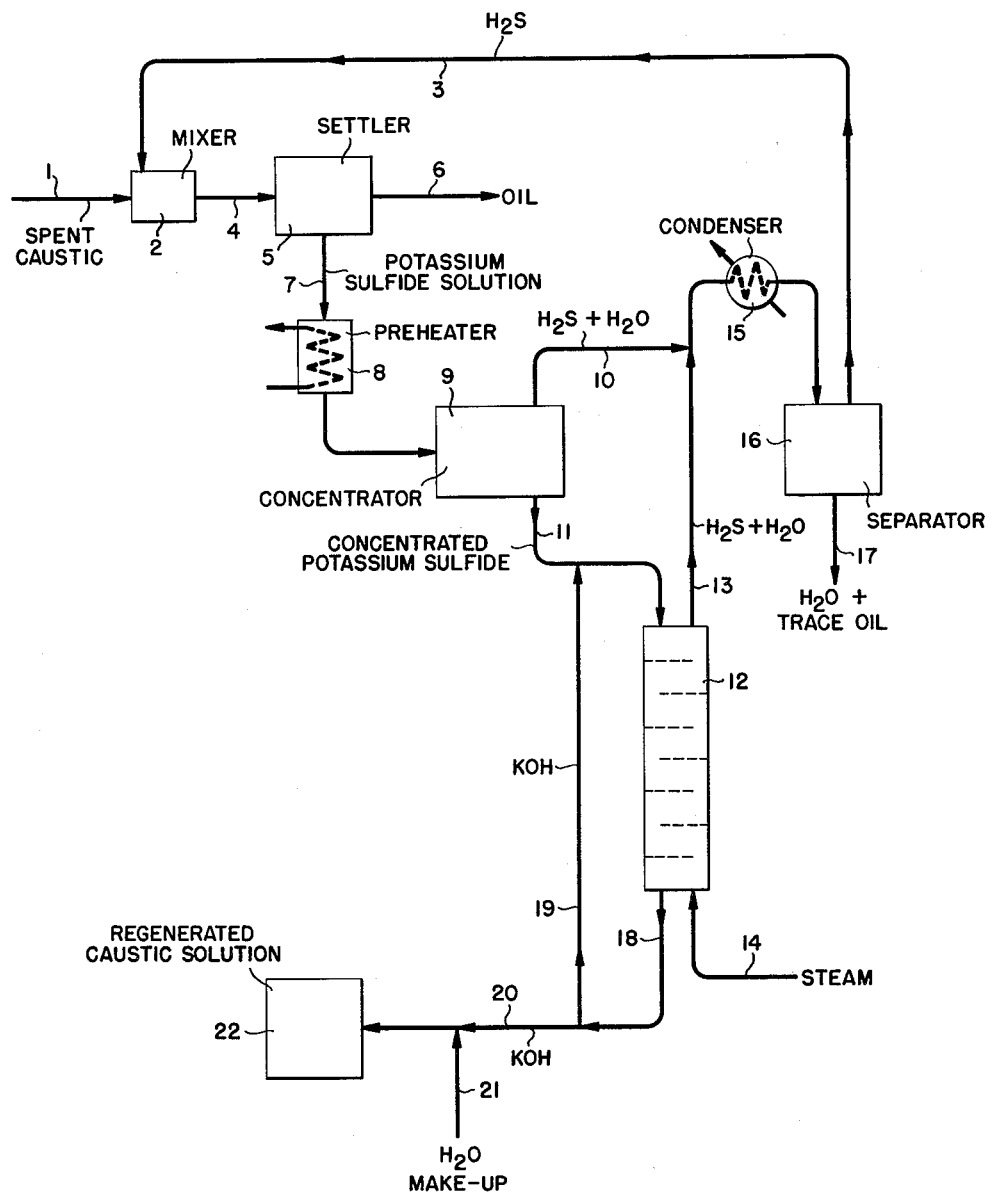

The present invention relates to the removal of impurities from alkali metal hydroxide solutions and more particularly relates to an improved process for the regeneration of spent potassium hydroxide solutions containing sulfides, mercaptides, phenolates, thiophenolates, naphthenates and the like.

Processes employing caustic for the sweetening of hydrocarbon oils and for the removal of acidic constituents from such oils are well known and are widely used throughout the petroleum industry. In such processes sulfides, mercaptans, phenols, thiophenols, cresols, xylenols, naphthenic acids and the like are extracted from the oil and converted into sodium salts which are retained in the caustic. Because of the large excesses of caustic required in these processes, periodic regeneration for the removal of the contaminants from the caustic is necessary if the processes are to be economically feasible. Normally, this regeneration is accomplished by heating the spent caustic solution to a temperature of from about 220° to about 280° F. and then stripping it at that temperature with steam. Sodium mercaptides present in the caustic are hydrolyzed to mercaptans and removed by the steam stripping. Sodium sulfide and other sodium salts present in the caustic are not affected by this treatment, however, and hence the regeneration is only a partial one. The impurities not removed by this partial regeneration accumulate in the caustic solution until it loses its effectiveness as an extracting agent or until it tends to form stable emulsions with the oil being treated. At that point it is necessary to discard the solution and replace it with fresh caustic.

Because of the expense involved in discarding caustic in this manner and because of the difficulty in disposing of large quantities of spent caustic without causing stream pollution, much research effort has been directed in recent years toward the problem of developing new and improved processes for caustic regeneration. A great many potential processes have been suggested, including treatment with oxygen or ozone, biological oxidation and electrolytic treating. None of these processes has proved satisfactory.

Most prior art has been concerned with regeneration of spent caustic from treating of naptha fractions. Hence, the spent caustic contains primarily mercaptans and, furthermore, mercaptans of relatively low boiling point (i.e. 55° to 430° F.). For such a spent caustic, steam stripping and/or air blowing have been satisfactory. However, when the spent caustic is from the treating of materials such as catalytic heating oils (430° to 650° F.), the caustic contains higher boiling mercaptans and also phenols, thiophenols and naphthenic acids having a boiling point greater than 430° F. Because of this high boiling point and also because of the chemical nature of these materials, simple steam stripping or air blowing is not satisfactory for regenerating the caustic. These higher boiling materials are not stripped out but are degraded to carbonates, free carbon and other undesirable constituents which degrade the caustic solution.

An important step forward was taken when it was found that the sulfides, disulfides, mercaptides, phenolates, thiophenolates, naphthenates, and other contaminants normally present in caustic and other alkali metal hydroxide solutions spent in treatment of hydrocarbon oils could be removed herefrom by first converting the hydroxides into the corresponding carbonate and bicarbonate by treatment with $CO_2$, thereby displacing or "springing" these weaker acidic components, and thereafter steaming at high temperature and pressure to convert the carbonate into the hydroxide. This process, however, presents some serious problems. Hydrolysis of carbonates requires rather high temperatures, and at the high temperatures needed to hydrolyze $Na_2CO_3$, it is necessary to operate at high pressures, of the order of 250 to 1500 p.s.i.g., in order to maintain liquid phase conditions. At these high pressures, steaming is too inefficient to be practical.

It is therefore an important object of the present invention to set forth a process for regenerating alkaline solutions spent in treating petroleum fractions in a manner whereby liquid phase conditions are maintained at substantially atmospheric pressures.

It is a still further object of the present invention to set forth a process for regenerating a spent potassium hydroxide solution in an economical and efficient manner.

Other and further objects and advantages of the present invention will be more clear hereinafter.

In accordance with the present invention, there is provided a universal caustic regeneration process which is applicable to spent KOH solutions, but not to NaOH solutions. By "universal" is meant that the contaminants in the spent caustic not only may be the mercaptans or sulfide usually found present when the caustic is used to scrub gases and light naphthas, but also phenols, thiophenols and naphthenic acids found in higher boiling hydrocarbon oils. In the process of the present invention, the steaming step is carried out at substantially atmospheric pressure while still maintaining a liquid phase in the process.

Hydrolysis by steam stripping under pressure has several disadvantages. In addition to requiring heavy-walled vessels for the high temperature and pressure, it also impedes the reaction being conducted, namely:

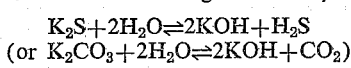

$$(or\ K_2CO_3 + 2H_2O \rightleftharpoons 2KOH + CO_2)$$

The above reactions are reversible reactions with equilibrium far on the side of the sulfide (or carbonate). For the reaction to give appreciable amounts of hydroxide, the volatile product, $H_2S$ (or $CO_2$), must be removed as formed. The lower the pressure, the more rapidly are these volatile reaction products ($H_2S$ or $CO_2$) removed. High pressure does, to some extent, aid shifting the above equilibrium to the right by, in effect, increasing the concentration of water in the reaction zone. This advantageous effect, however, is lost because of the undesirable effect of pressure on the rate of $H_2S$ (or $CO_2$) removal from the reaction zone. Thus, the overall hydrolytic reaction is favored by high temperatures and low pressures.

An important consideration in the process of the present invention is that advantage is taken of the fact that KOH holds water far more tenaciously at elevated temperature than does NaOH. For example, at 650° F. and at atmospheric pressure KOH solution still contains as much as 14% water and is liquid, whereas at even lower temperatures such as 600° F., NaOH is substantially anhydrous and solid.

In brief compass, in accordance with the present invention, spent KOH solution containing some or all of the impurities enumerated above is first treated with $H_2S$ to liberate the weaker acids, which separate as an oil and are withdrawn. The potassium sulfide solution is then preferably partially concentrated and the concentrate passed to the top of a tower. During the concentration step, partial hydrolysis occurs. A countercurrent flow of high temperature steam passes upwardly through the tower, and, at the high temperature of 600° to 950° F., hydrolysis is completed. In order to insure the maintenance of the spent KOH liquid at the steaming conditions, a portion of the regenerated KOH may be recycled to the steaming zone. By operating in accordance with this process, atmospheric pressures are maintained in the steaming zone without formation of a solid phase.

The use of $H_2S$ rather than $CO_2$ as a springing agent for dilute contaminated caustic potash is of great advantage in that $H_2S$ is a weaker acid than $CO_2$. Hence the sulfides, and particularly the potassium sulfide, is more readily hydrolyzed than the carbonate, allowing operation at lower temperature and thus contributing to the maintenance of a liquid phase during the steaming operation.

The process finds primary application in the regeneration of KOH solutions used in the refining of hydrocarbon oils. Such solutions may range from about 1 to about 30° Baumé and thus contain from about 1 to about 25% potassium hydroxide. Normally they have a concentration of about 15° Baumé and thus contain about 11% KOH. The extent to which such streams are utilized before being discarded is determined by the concentration at which contaminants tend to re-enter the oil from the caustic solution, rather than by the concentration of the caustic itself. In most refinery operations the caustic is generally about 50 to 60% spent before it is discarded.

The sulfiding step of the process is carried out by contacting the KOH solution to be regenerated with $H_2S$, or a gas stream containing hydrogen sulfide. The contacting temperature during the sulfiding or springing may range from about 60° to about 150° F., lower temperatures being generally preferred. Contacting of the spent KOH with the $H_2S$ at about 100° F. is particularly effective. In the sulfiding step of the process, the KOH is preferably converted completely to the bisulfide in order to assure complete reaction of the phenols, mercaptides and other contaminants in the caustic. The amount of $H_2S$ employed will vary considerably depending upon the concentration of the spent caustic potash solution and the contacting conditions employed.

Following the sulfiding step of the process, mercaptides, phenols and similar contaminants released during the sulfiding step are separated from the solution by decanting, or a similar separation step. These contaminants form an oily layer on top of the solution. The phenols and naphthenic acids are slightly more soluble in the solution than are the thiophenols and will in part be carried over to the hydrolysis step of the process. These are, for the most part, subsequently removed during the hydrolysis reaction.

In order to recover the hydroxide from the sulfided solution formed during the sulfiding step of the process, the solution is stripped with steam at a temperature of from about 500° to about 1100° F. It has been found that elevated temperatures are essential for the conversion step and that temperatures of from about 650° to about 900° F. are particularly effective. The steam employed may be either saturated steam or superheated steam and, in accordance with the present invention, atmospheric pressure is used. The solution must, of course, be maintained in the liquid phase in order for the hydrolysis reaction to take place. The total steam used may be varied from about 5 to about 35 pounds of steam per pound of KOH to be regenerated and will preferably range from about 10 to about 15 pounds of steam per pound of KOH. The solution may be treated with the steam during a period of from about one-half hour to about 10 hours. Treatment for about 4 to 6 hours is generally preferred. Since only a small amount of the heat in the steam employed in the process is lost, it will generally be advantageous to recover the steam and use it in other processes.

The nature and objects of the invention may be better understood from the following detailed description of a preferred embodiment of the process and from the accompanying drawing illustrating that embodiment.

Referring now to the drawing, a spent KOH solution containing sulfides, mercaptides, phenolates, thiophenolates, naphthenates and other contaminants derived from the treatment of hydrocarbon oils is introduced at ambient temperature through line 1 into contacting zone 2. The spent KOH concentration may range from about 1 to about 25%, or higher, hydroxide. Contacting zone 2 is preferably a countercurrent liquid gas contacting zone fitted with trays or packed with Raschig rings, stoneware saddles or the like but other conventional contacting apparatus may also be employed. A gas stream containing from about 1 to about 15% or more of $H_2S$, for example, is introduced into contacting zone 2 through line 3 and flows preferably countercurrent to the stream of spent caustic. The amount of $H_2S$ added is at least one-quarter pound per pound of KOH, and preferably at least 0.6 pound per pound KOH. Conversion of the hydroxide solution to the sulfide and bisulfide having been completed, the sulfided solution is withdrawn through line 4 and passed to settling zone 5.

The latter is maintained at ambient temperature, 30° to 150° F., and pressure of 0 to 100 p.s.i.g. An oily layer consisting principally of phenols, mercaptans, and naphthenic acids is formed at the top of the zone and is removed therefrom through line 6. The sulfided solution is then passed via line 7 and preheater 8 to concentrator 9. The latter serves the purpose of reducing the volume of liquid to be treated subsequently in the steaming operation and also a partial hydrolysis of the sulfides takes place. The solution is concentrated so that the effluent is about 30% to 60% or even higher. Temperature in 9 is in the range of 212° to 400° F., preferably about 350° F. $H_2S$ and water are withdrawn overhead through line 10 for reuse in the process.

The spent and concentrated effluent from 9 is passed via line 11, mixed with recycled regenerated KOH, and is injected into the top of steam treating tower 12. The latter preferably is a tower containing packing, plates or other contacting devices arranged for countercurrent contacting of the spent KOH or $K_2S$ with steam which enters via line 14 at a temperature of 700° to 950° F., preferably about 900° F.

The steam countercurrently contacts the downflowing solution and is removed from the top of the hydrolysis zone through line 13, along with the $H_2S$. A temperature gradient is maintained in the steam stripper, the steam being withdrawn from the top of tower 12 having a temperature of about 212° to 400° F., preferably about 350° F. The pressure maintained within tower 12 is below 100 p.s.i.g., and preferably 0 to 20 p.s.i.g. The steam completes the hydrolysis of the potassium salts and strips out the remaining acidic components as well as the $H_2S$. These are withdrawn through line 13, condensed in 15 and passed to separator 16. The $H_2S$ is removed overhead and recycled to mixer 3, while water and remaining organic acidic components are withdrawn through line 17.

Returning now to tower 12, a product stream consisting of regenerated KOH is withdrawn through line 18. In accordance with the present invention, up to 50% by weight thereof may be recycled to the incoming stream of sulfide to maintain liquid phase in tower 12 by virtue of the water retention property of KOH previously detailed. The balance of the hydrolyzed solution is withdrawn through line 20 as regenerated KOH. If desired, this stream may be diluted with water through line 21 and is then passed to storage vessel 22.

The process of the present invention may be further illustrated as follows:

As feed into mixer 2 there is passed KOH spent from washing catalytic heating oil, at a rate of 1000 gallons per hour. The concentrate of potassium (as KOH) is about 6%. At least 3½, and preferably about 18 s.c.f., of $H_2S$ per gallon of the spent KOH is used to spring the acidic organic contaminants from the caustic solution. In the separator there is formed an oil layer whose typical composition, based on spent KOH solution, is 0.5% mercaptans, 1.7% thiophenols, and 0.8% phenols. The aqueous layer contains about 3.5% dissolved $H_2S$, about 5 to 7.8% by weight of KSH, up to 2% of $K_2S$, and to 0.2% phenols. Free KOH, mercaptans and thiophenols are substantially absent.

In the concentration stage, the preferred temperature is 300° F. and the pressure ambient; the effluent from this step is a 60% solution of $K_2S$ and KSH, with some KOH. The steam stripping stage is carried out at ambient pressure and a bottoms temperature of 800° F. and a steam rate equivalent to about 410 gallons water per hour and a residence time of about 30 minutes for the concentrate. The effluent caustic stream is about 88% KOH, 2% KSH and 10% water. It contains no more than traces of hydrogen sulfide.

The relative rates of hydrolysis of solid $K_2S$ and $K_2CO_3$ were compared at atmospheric pressure:

|  | Temp., °F. | Steam Rate [1] | Percent Hydrolysis In 1 Hour |
|---|---|---|---|
| $K_2S$ | 900 | 30 | 99 |
| $K_2S$ | 700 | 30 | 76 |
| $K_2S$ | 700 | 7.5 | 52 |
| $K_2CO_3$ | 1,000 | 15 | 3 |

[1] Mols of steam per mol $K_2S$ or $K_2CO_3$.

These results show the substantially higher hydrolysis rates of $K_2S$ over $K_2CO_3$, and thus the advantage of using $H_2S$ rather than $CO_2$ as an acid liberation agent.

What is claimed is:

1. An improved process for the regeneration of a spent potassium hydroxide solution containing mercaptides, sulfides, naphthenates and phenolic contaminants which comprises treating said solution with a hydrogen sulfide containing gas, withdrawing insoluble materials from the sulfided solution, contacting said sulfided solution with steam under elevated conditions of temperature and at a pressure below 100 p.s.i.g., and recovering regenerated potassium hydroxide solution.

2. A process as defined by claim 1 wherein said sulfided solution is contacted with steam at a temperature of from about 600° to about 950° F.

3. A process as defined by claim 1 wherein said sulfided solution is contacted with steam at a pressure of from about 0 to about 100 p.s.i.g.

4. An improved process for the regeneration of a potassium hydroxide solution spent in the treatment of a hydrocarbon oil which comprises sulfiding said solution, withdrawing insoluble materials from the sulfided solution, partially concentrating said sulfided solution and partially hydroylzing the same, thereafter contacting said partially concentrated solution with steam at a temperature of from about 600° to about 950° F. and at a pressure of from about 0 to about 100 p.s.i.g., maintaining said potassium containing solution in liquid phase, and recovering regenerated potassium hydroxide solution.

5. The process of claim 4 wherein up to 50% by weight of said regenerated KOH solution is recycled to the steam contacting zone.

References Cited in the file of this patent
UNITED STATES PATENTS

| 2,009,954 | Burk | July 30, 1935 |
| 2,199,208 | Owen | Apr. 30, 1940 |
| 2,279,711 | Luten | Apr. 14, 1942 |